United States Patent
Imakura et al.

(10) Patent No.: US 10,493,730 B2
(45) Date of Patent: Dec. 3, 2019

(54) TRANSFER FILM

(71) Applicant: Dai Nippon Printing Co., Ltd., Tokyo (JP)

(72) Inventors: Yoshihiro Imakura, Tokyo (JP); Ryoji Hattori, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 36 days.

(21) Appl. No.: 15/555,627

(22) PCT Filed: Mar. 23, 2016

(86) PCT No.: PCT/JP2016/059185
§ 371 (c)(1),
(2) Date: Sep. 5, 2017

(87) PCT Pub. No.: WO2016/152918
PCT Pub. Date: Sep. 29, 2016

(65) Prior Publication Data
US 2018/0037012 A1 Feb. 8, 2018

(30) Foreign Application Priority Data

Mar. 23, 2015 (JP) .................................. 2015-059745
Mar. 22, 2016 (JP) .................................. 2016-057423

(51) Int. Cl.
| | |
|---|---|
| *B05D 1/30* | (2006.01) |
| *B05D 3/06* | (2006.01) |
| *B32B 25/08* | (2006.01) |
| *B32B 25/14* | (2006.01) |
| *B32B 27/30* | (2006.01) |
| *B32B 37/00* | (2006.01) |
| *B32B 7/06* | (2019.01) |
| *B42D 25/23* | (2014.01) |
| *B42D 25/328* | (2014.01) |
| *B42D 25/36* | (2014.01) |
| *B42D 25/45* | (2014.01) |
| *B42D 25/47* | (2014.01) |
| *B44C 1/17* | (2006.01) |
| *C08J 7/04* | (2006.01) |

(52) U.S. Cl.
CPC ............... *B32B 25/08* (2013.01); *B32B 7/06* (2013.01); *B32B 25/14* (2013.01); *B32B 27/30* (2013.01); *B32B 37/025* (2013.01); *B42D 25/23* (2014.10); *B42D 25/328* (2014.10); *B42D 25/36* (2014.10); *B42D 25/45* (2014.10); *B42D 25/47* (2014.10); *B44C 1/1712* (2013.01); *C08J 7/042* (2013.01); *B05D 1/30* (2013.01); *B05D 3/067* (2013.01); *B32B 2425/00* (2013.01); *C08J 2367/02* (2013.01); *C08J 2479/04* (2013.01)

(58) Field of Classification Search
CPC ......... B32B 25/13; B32B 25/14; B32B 27/30; B32B 37/00; B05D 1/30; B05D 3/06; B42D 25/23; B42D 25/328; B42D 25/36; B42D 25/45; B42D 25/47; B44C 1/17; C08J 7/04
See application file for complete search history.

(56) References Cited

U.S. PATENT DOCUMENTS

| | | | |
|---|---|---|---|
| 5,427,997 A | 6/1995 | Oshima et al. | |
| 6,001,771 A | 12/1999 | Nakano et al. | |
| 6,465,079 B1 * | 10/2002 | Ebihara | B41M 5/395 347/217 |
| 2004/0028910 A1 * | 2/2004 | Yamamoto | B29C 45/14827 428/421 |
| 2015/0360497 A1 * | 12/2015 | Ishida | B41M 5/395 428/32.69 |

FOREIGN PATENT DOCUMENTS

| | | |
|---|---|---|
| JP | 60-108483 A1 | 6/1985 |
| JP | 03-045391 A1 | 2/1991 |
| JP | 05-155199 A1 | 6/1993 |
| JP | H07-156532 A | 6/1995 |
| JP | 10-129134 A1 | 5/1998 |
| JP | 10-315639 A1 | 12/1998 |
| JP | 2006-001211 A1 | 1/2006 |
| JP | 2007-118466 A1 | 5/2007 |
| JP | 2009-067012 A1 | 4/2009 |
| JP | 2009-137239 A1 | 6/2009 |
| JP | 2013-256105 A1 | 12/2013 |
| JP | 2016-097668 A1 | 5/2016 |

OTHER PUBLICATIONS

Machine translation of JP 2013-256105 obtained from the European Patent Office dated Jan. 2019.*
English translation of International Preliminary Report on Patentability (Chapter I) (Application No. PCT/JP2016/059185) dated Oct. 5, 2017, 7 pages.
International Search Report and Written Opinion (Application No. PCT/JP2016/059185) dated Jun. 28, 2016.
Chinese Office Action (with English translation), Chinese Application No. 201680012861.9, dated Feb. 15, 2019 (13 pages).
Japanese Office Action (with English translation), Japanese Application No. 2016-057423, dated Sep. 13, 2019 (10 pages).

* cited by examiner

*Primary Examiner* — Melissa A Rioja
(74) *Attorney, Agent, or Firm* — Burr & Brown, PLLC (57) ABSTRACT

An object is to provide a transfer film that can impart sufficient durability performance to a transfer object surface and can also have excellent peeling stability without causing any transfer failures such as tailing and burr. A transfer film including at least a substrate, a release layer provided on the substrate, an intermediate layer provided on the release layer, and a protective layer provided on the intermediate layer, in which the intermediate layer includes a wax component and a rubber component, and the protective layer includes an active light curing resin.

8 Claims, 1 Drawing Sheet

TRANSFER FILM

BACKGROUND OF THE INVENTION

1. Field of the Invention

The present invention relates to a transfer film favorable in transfer property, and more specifically relates to a transfer film that can impart sufficient durability performance to a transfer object surface and can also have excellent peeling stability without causing any transfer failures such as tailing and burr.

DESCRIPTION OF RELATED ART

ID cards such as identification card and IC cards such as an ATM card, where individual information such as a face photo, an address, and a name are recorded, have security features so that the contents of the information are not falsified and altered. For example, an IC card having a surface on which hologram is provided is widely distributed. Such an IC card has a surface on which a transfer layer is provided by using a transfer film, in order to protect the recorded information and the hologram.

A transfer film has a configuration where a transfer layer including a protective layer or the like, which can be transferred onto a substrate, is provided, and the transfer layer can be transferred onto the surface of a transfer object such as an IC card, to thereby impart durability performances such as solvent resistance and wear resistance to a transfer object surface. While the transfer layer is enhanced in transfer efficiency as being more easily peeled from the substrate, and therefore preferably adheres to the substrate by a minimum adhesion force, the adhesion force of the transfer layer and the substrate is so weak to cause a transfer layer, not to be transferred, to also be transferred to the transfer object, namely, cause the occurrence of so-called transfer failures such as tailing and burr. In order to solve such a problem, for example, an adhesion force that allows the transfer layer to be property held on the substrate is imparted to the transfer film by addition of a melamine resin or the like to a release layer which is provided between the substrate and the transfer layer (see, for example, Patent Literature 1).

A protective layer that is provided by use of a transfer film plays a role in protecting the surface of a transfer object such as an IC card, and therefore the protective layer is demanded to have a high surface strength. Therefore, the protective layer is formed by using an active light curing resin that is cured by ultraviolet light or the like. If such a resin is used in order to increase surface hardness of the protective layer, however, the following problems are caused even when a release layer including a melamine resin is provided: foil cutting is increased, and an adhesion force of a transfer layer and a substrate is excessively decreased and/or surface strength of the protective layer is reduced, depending on a resin used.

CITATION LIST

Patent Literature

Patent Literature 1: JP 2009-67012 A

SUMMARY OF THE INVENTION

Technical Problem

The present inventors have here found that transfer failures described above are caused by any interaction of a component in a resin for use in the protective layer with the melamine resin in the release layer. The present inventors have also found that a peeling force in transfer of the protective layer from the transfer film is not uniform, thereby consequently causing such transfer failures. The present inventors have found based on these findings that an intermediate layer including wax and a rubber component can be provided between the substrate and the release layer of the transfer film, thereby reducing transfer failures such as tailing and burr, and imparting a uniform peeling force. The present invention has been made based on such findings.

Accordingly, an object of the present invention is to provide a transfer film that can impart sufficient durability performance to a transfer object surface and can also have excellent peeling stability without causing any transfer failures such as tailing and burr.

Solution to Problem

The present inventors have found that the above object can be achieved by the transfer film according to the present invention including at least a substrate, a release layer provided on the substrate, an intermediate layer provided on the release layer, and a protective layer provided on the intermediate layer, in which the intermediate layer includes a wax component and a rubber component, and the protective layer includes an active light curing resin; leading to completion of the present invention.

That is, one aspect of the present invention provides a transfer film including at least a substrate, as well as a release layer, an intermediate layer including a wax component and a rubber component, and a protective layer including an active light curing resin, on the substrate.

In the transfer film according to the present invention, the intermediate layer preferably includes styrene-butadiene rubber as the rubber component.

In the transfer film according to the present invention, the intermediate layer preferably includes polyethylene wax as the wax component.

In the transfer film according to the present invention, the intermediate layer preferably includes carnauba wax as the wax component.

In the transfer film according to the present invention, the compounding ratio of the polyethylene wax and the carnauba wax (polyethylene wax/carnauba wax) is preferably 1/8 or more and 8 or less on a mass basis.

In the transfer film according to the present invention, the rubber component preferably has a particle shape having a volume average particle size of 80 nm or more and 250 nm or less.

In the transfer film according to the present invention, the intermediate layer preferably includes 0.01% by mass or more and 20% by mass or less of the rubber component.

In the transfer film according to the present invention, the thickness of the intermediate layer is preferably 0.05 μm or more and 1 μm or less.

In the transfer film according to the present invention, the active light curing resin layer preferably includes an unsaturated group-containing acrylic copolymer including a monomer unit represented by the following general formula (1):

[Formula 1]

(1)

wherein each of $R_1$ and $R_2$ independently represents a hydrogen atom or a methyl group, $R_3$ represents a hydrogen atom, an alkyl group or an aryl group, provided that when $R_2$ represents a methyl group, $R_3$ represents a hydrogen atom, and L represents a divalent linking group.

The transfer film according to the present invention preferably further includes a receptive layer on the protective layer.

In the transfer film according to the present invention, the release layer preferably includes a melamine-based resin.

Advantageous Effect of Invention

The transfer film according to the present invention includes a release layer, a protective layer including an active light curing resin, and an intermediate layer including a wax component and a rubber component, and therefore can impart sufficient durability performance to a transfer object surface, can transfer a transfer layer without causing any transfer failures, and has a high peeling stability.

DETAILED DESCRIPTION OF THE INVENTION

<Definition>
Herein, the terms "part(s)", "%", "ratio", and the like with respect to compounding are on a mass basis, unless particularly noted. In addition, the term "active light curable resin" means a precursor or a composition before irradiation with active light, and the active light curable resin subjected to curing by irradiation with active light refers to an active light curing resin.

Figure 1:
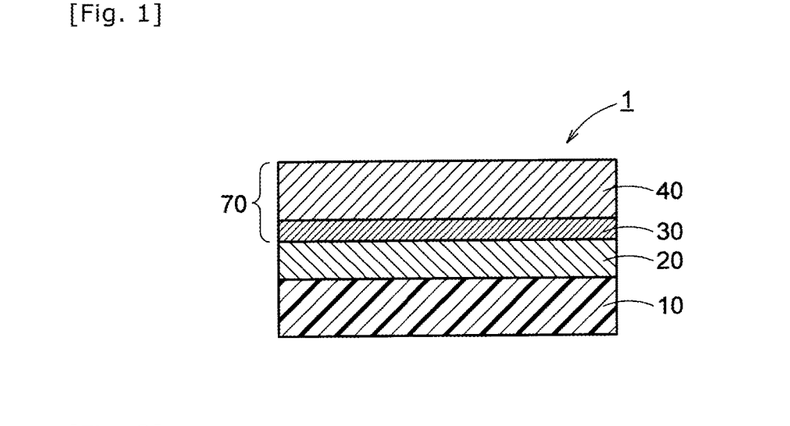
FIG. 1 is a schematic cross-sectional view of a transfer film according to one embodiment of the present invention.
Figure 2:
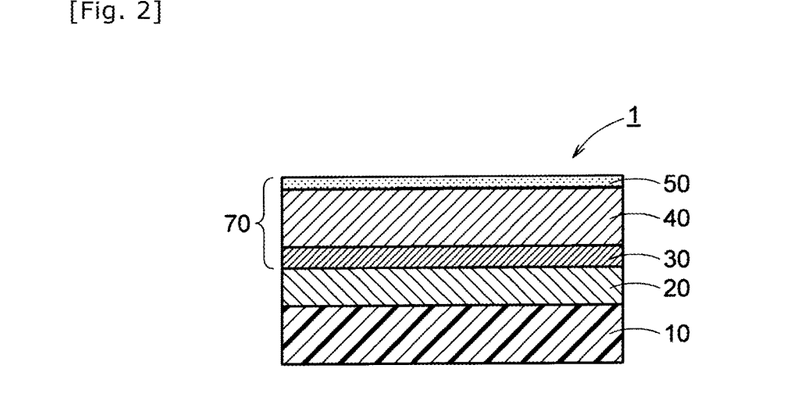
FIG. 2 is a schematic cross-sectional view of a transfer film according to one embodiment of the present invention.
Figure 3:
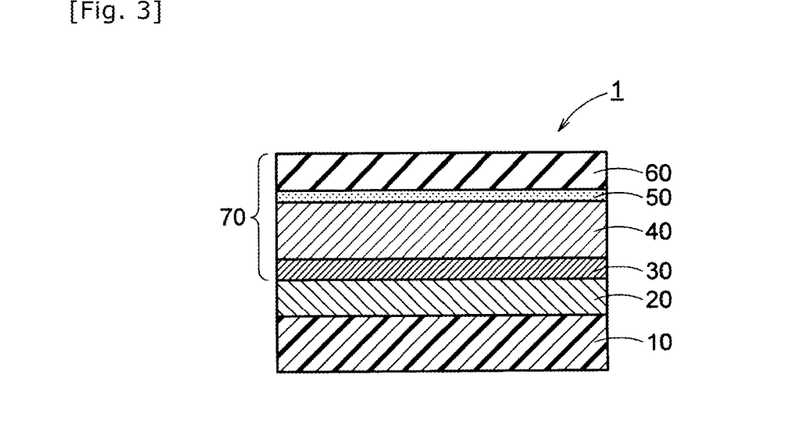
FIG. 3 is a schematic cross-sectional view of a transfer film according to one embodiment of the present invention.

Herein, the term "active light" means any radiation that can chemically act on the active light curable resin to promote polymerization, and specifically means visible light, ultraviolet light, X-ray, electron beam, α-ray, β-ray, γ-ray, and the like.
<Transfer Film>
The transfer film according to the present invention is described in detail with reference to drawings. FIG. 1 illustrates a schematic cross-sectional view of a transfer film according to one embodiment of the present invention. A transfer film 1 according to the present invention includes at least a substrate 10, and a release layer 20, an intermediate layer 30 and a protective layer 40 provided on the substrate 10, as illustrated in FIG. 1. According to one embodiment, the transfer film 1 may include an adhesive layer 50 and a receptive layer 60 on the protective layer 40, as illustrated in FIG. 2 and FIG. 3. When such a transfer film 1 is used to perform transfer to a transfer object (not illustrated), a transfer layer 70 (including the intermediate layer 30, the protective layer 40, the adhesive layer 50 and the receptive layer 60 when the adhesive layer 50 and the receptive layer 60 are provided) is transferred to the transfer object. As described below, the adhesive layer, when the configuration thereof is adjusted, can also thus serve as a receptive layer. Hereinafter, respective layers forming the transfer film according to the present invention are described.
<Substrate>
Any substrate can be used as the substrate without particular limitation, as long as such any substrate has heat resistance so as to be able to withstand heat energy (for example, heat of a thermal head) in transfer of the transfer layer from the transfer film to the transfer object and has mechanical strength and solvent resistance so as to be able to support the transfer layer. Examples include films, sheets, and boards produced using polyester-based resins such as polyethylene terephthalate, polybutylene terephthalate, polyethylene naphthalate, a polyethylene terephthalate-isophthalate copolymer, a terephthalic acid-cyclohexanedimethanol-ethylene glycol copolymer and a co-extruded film of polyethylene terephthalate/polyethylene naphthalate, polyamide-based resins such as nylon-6 and nylon-6,6, polyolefin-based resins such as polyethylene, polypropylene and polymethylpentene, vinyl resins such as polyvinyl chloride, acrylic resins such as polyacrylate, polymethacrylate and polymethyl methacrylate, imide-based resins such as polyimide and polyetherimide, engineering resins such as polyarylate, polysulfone, polyether sulfone, polyphenylene ether, polyphenylene sulfide, polyaramid, polyether ketone, polyether nitrile, polyether ether ketone and polyether sulfite, polycarbonate, styrene-based resins such as polystyrene, high-impact polystyrene, an AS resin (acrylonitrile-styrene copolymer) and an ABS resin (acrylonitrile-butadiene-styrene copolymer), and cellulose-based resins such as cellophane, cellulose acetate and nitrocellulose.

The substrate may be a copolymer resin or a composite (including an alloy) mainly containing any resin(s) described above, or a layered article including a plurality of layers. While the substrate may be a stretched film or an unstretched film, a film uniaxially or biaxially stretched is preferably used for the purpose of an enhancement in strength. Among substrates made of resins described above, a film of polyester such as polyethylene terephthalate or polyethylene naphthalate is suitably used because of being excellent in heat resistance and mechanical strength, and, in particular, a polyethylene terephthalate film is more preferable.

In addition, asperities can be, if necessary, imparted to the substrate surface in order to prevent blocking. Examples of the procedure for forming such asperities include kneading of a matting agent, sandblast processing, hairline processing, matt coating, or chemical etching. In the case of matt coating, any of an organic substance and an inorganic substance may be used The thickness of the substrate is preferably 0.5 μm or more and 50 μm or less, more preferably 4 μm or more and 20 μm or less. The thickness of the substrate can fall within the above numerical value range, thereby enhancing transmission property of heat energy in transfer of the transfer layer from the transfer film, with mechanical strength being kept.

A surface of the substrate, on which the release layer is to be provided, may be, in advance, subjected to an easily adhesive treatment such as a corona discharge treatment, a plasma treatment, an ozone treatment, a frame treatment, a primer (also referred to as "anchor coat", "adhesion promoter" or "easy adhesive agent") coating treatment, a preheating treatment, a dust removal treatment, a vapor deposition treatment, an alkali treatment, or providing of an antistatic layer, as described below, in order that the release layer is provided on the surface. Additive(s) such as a filler, a plasticizer, a colorant, and an antistatic agent may also be, if necessary, added to the substrate.

<Release Layer>

Next, the release layer included in the transfer film according to the present invention is described. The release layer provided on the substrate is a layer that allows the transfer layer provided thereon to be peeled from the transfer film and to be transferred to the transfer object. In peeling of the transfer layer from the transfer film, the release layer remains on the substrate.

Examples of the resin for use in the release layer include a melamine-based resin, a fluororesin, a cellulose-based resin, a urea-based resin, a polyolefin-based resin, an acrylic resin and a cellulose-based resin. Among them, a melamine-based resin is preferable because of being capable of imparting a proper adhesion force of the transfer layer and the substrate to the transfer film.

The thickness of the release layer is usually preferably 0.05 µm or more and 5 µm or less, more preferably 0.1 µm or more and 2 µm or less.

The release layer can be formed by dissolving or dispersing the above resin in a solvent, coating the substrate with the resulting coating liquid by a known coating method, such as roll coating or gravure coating and drying it, and baking it at a temperature of about 150° C. or more and about 200° C. or less. Alternatively, the release layer can also be formed by dissolving or dispersing the above resin in a solvent, coating an unstretched or uniaxially stretched polyethylene terephthalate film (substrate) or the like with the coating liquid, drying the resultant, thereafter stretching the resultant at least uniaxially, and then performing a heat treatment.

<Intermediate Layer>

Next, the intermediate layer that is provided on the release layer to form the transfer layer is described. In the present invention, the intermediate layer includes a wax component and a rubber component, and therefore has a function of adjusting an adhesion force of the release layer and the transfer layer and a function of enhancing peeling stability even when a protective layer high in surface strength, as described below, is used. The intermediate layer is peeled together with the transfer layer in transfer.

Examples of the wax component include polyethylene wax, carnauba wax, paraffin wax, microcrystalline wax, candelilla wax, whale wax, Japanese wax, beeswax, partially modified wax, fatty acid esters, and fatty acid amides. Such wax components may be used singly or in combination of two or more kinds thereof. Among the above wax components, polyethylene wax and carnauba wax are preferable, and polyethylene wax is more preferable. Furthermore, polyethylene wax and carnauba wax are preferably used in combination. When the intermediate layer includes polyethylene wax and carnauba wax, the compounding ratio thereof (polyethylene wax/carnauba wax) is preferably 1/8 or more and 8 or less, further preferably 0.5 or more and 5 or less, on a mass basis.

Carnauba wax is wax derived from Palmae, and includes natural carnauba wax, and a by-product and a derivative thereof. Examples of a commercially available carnauba wax include WE-95, WE-188 and WE-200 produced by Konishi Co., Ltd.

Examples of the rubber component include butadiene rubber, styrene-butadiene rubber, nitrile rubber, nitrile/butadiene rubber, high-styrene rubber, isobutylene rubber, acrylic rubber, epichlorohydrin rubber, butyl rubber and ethylene-propylene rubber, and modified products thereof. Such rubber components may be used singly or in combination of two or more kinds thereof. Among such rubber components, styrene-butadiene rubber is particularly preferable. Examples of a particularly preferable rubber component include Nipol LX430, Nipol LX433C, Nipol LX435 and Nipol 2507H (trade names) produced by ZEON CORPORATION.

The glass transition temperature (Tg) of the rubber component is preferably 20° C. or less. More preferably, Tg is −20° C. or more and 20° C. or less, particularly preferably 0° C. or more and 10° C. or less. Tg can fall within the above numerical value range, thereby imparting peeling stability and preventing layers adjacent to each other from being mixed. Tg can be determined by differential scanning calorimetry according to JIS-K-7121 (published in 2012).

The rubber component preferably has a particle shape having a volume average particle size of 80 nm or more and 250 nm or less, more preferably 100 nm or more and 200 nm or less. The volume average particle size can be measured with a particle size/particle diameter distribution analyzer (for example, Nanotrac particle size distribution analyzer manufactured by NIKKISO CO., LTD.) according to JIS-Z-8819-2 (published in 2001).

The wax component is preferably included in the intermediate layer in a proportion of 50% by mass or more and 99% by mass or less, more preferably 69% by mass or more and 98% by mass or less. The content of the wax component in the intermediate layer can fall within the above numerical value range, thereby enhancing peeling stability of the transfer film. The rubber component is preferably included in the intermediate layer in a proportion of 0.01% by mass or more and 35% by mass or less, more preferably 2% by mass or more and 32% by mass or less.

The thickness of the intermediate layer is preferably 0.05 µm or more and 1 µm or less, more preferably 0.05 µm or more and 0.5 µm or less. The thickness of the intermediate layer can fall within the above numerical value range, thereby enhancing transfer efficiency.

The thickness of the intermediate layer can fall within the above numerical value range, thereby preventing transfer failures such as so-called picking and lacking which cause a transfer object, which is to be transferred, to be broken and peeled off towards the transfer film, preventing transfer failures such as tailing and burr which cause a transfer layer, which is not needed to be transferred, to also be partially transferred, and enhancing foil cutting resistance and peeling stability.

The intermediate layer can be formed by coating the substrate or the release layer with a coating liquid in which the wax component and the rubber component are dispersed or dissolved in a solvent, by a known procedure such as roll coating, reverse roll coating, gravure coating, reverse gravure coating, bar coating or rod coating, and drying the resultant.

<Protective Layer>

Next, the protective layer is described. The protective layer serves to protect the transfer object surface after transfer, and includes an active light curing resin. The protective layer included in the transfer film according to the present invention includes an active light curing resin, has a high surface strength, and can impart sufficient durability performance to the transfer object surface.

The active light curable resin forming the protective layer preferably includes an unsaturated group-containing acrylic copolymer including a monomer unit represented by the following general formula (1).

[Formula 2]

(1)

In the general formula (1), each of $R_1$ and $R_2$ independently represents a hydrogen atom or a methyl group, and $R_3$ represents a hydrogen atom, an alkyl group or an aryl group. The alkyl group as $R_3$ is preferably an alkyl group having up to 7 carbon atoms, such as a methyl group or an ethyl group. The aryl group as $R_3$ is preferably an aryl group having up to 10 carbon atoms, such as a phenyl group or a naphthyl group. Herein, when $R_2$ represents a methyl group, $R_3$ represents a hydrogen atom.

In the general formula (1), L represents a divalent linking group, and examples thereof include —$CH_2$—CH(OH)—$CH_2$—O—, —$OCH_2$CH(OH)$CH_2$OCO—, —$OCH_2CH_2$OCONH—$R_4$—NHCOOCH$_2$— (wherein $R_4$ represents a p-phenylene group), —$OCH_2CH_2$OCOCH$_2$CH$_2$COO-CH$_2$—, and —$OCH_2CH_2$OCO—$R_5$—COOCH$_2$— (wherein $R_5$ represents an o-phenylene group). Among them, L preferably represents —$CH_2$—CH(OH)—$CH_2$—O—.

The monomer represented by the general formula (1) can be obtained by a method where α,β-unsaturated carboxylic acids (for example, acrylic acid, methacrylic acid, maleic acid, maleic anhydride, itaconic acid, and itaconic anhydride) which are monomers having a carboxyl group are once copolymerized with an anhydride such as maleic anhydride, and thereafter a carboxylic acid moiety at one side is subjected to hydrolysis of the anhydride by an alcohol such as methanol, ethanol, propanol or butanol, thereby adding a long-chain alkyl group to the carboxylic acid moiety at one side, or a dicarboxylic acid or an acid anhydride is polymerization reacted with an active group in a polymer, such as a hydroxyl group or an amino group.

The unsaturated group-containing acrylic copolymer preferably includes the monomer unit represented by the general formula (1) in its molecule in a proportion of 0.01% by mass or more and 50% by mass or less, more preferably 0.1% by mass or more and 20% by mass or less. The monomer unit represented by the general formula (1) can be included within the above range, thereby effectively synthesizing an unsaturated group-containing acrylic copolymer, and also providing a protective layer having a high surface strength.

Examples of other monomer unit to be copolymerized with the monomer unit represented by the general formula (1) include a monomer having an aromatic hydroxyl group, a monomer having an aliphatic hydroxyl group, a monomer having an aminosulfonyl group, a monomer having a sulfonamide group, α,β-unsaturated carboxylic acids, substituted or unsubstituted alkyl acrylate, substituted or unsubstituted alkyl methacrylate, acrylamides or methacrylamides, an alkyl fluoride group-containing monomer, vinyl ethers, vinyl esters, styrenes, vinyl ketones, olefins, N-vinylpyrrolidone, N-vinylcarbazole, 4-vinylpyridine, a monomer having a cyano group, and a monomer having an amino group.

The acid value (mgKOH/g) of the unsaturated group-containing acrylic copolymer is preferably 5 or more and 500 or less, more preferably 10 or more and 150 or less. An unsaturated group-containing acrylic copolymer whose acid value falls within the above range can be used, thereby resulting in an improvement in adhesion property with an adhesive layer described below and also providing a transfer layer having a high surface strength. Herein, the "acid value" means the number of milligrams of potassium hydroxide required for neutralization of a free fatty acid contained in 1 g of a polymer, and can be measured by a method according to JIS-K-2501. The acid value of a polymer can be appropriately adjusted by adjustment of the rate of a monomer component forming the polymer.

The weight average molecular weight of the unsaturated group-containing acrylic copolymer is preferably 3000 or more and 100000 or less, more preferably 10000 or more and 80000 or less. The weight average molecular weight of the unsaturated group-containing acrylic copolymer can fall within the above numerical value range, thereby enhancing heat resistance, chemical resistance and scratch strength. The occurrence of a gelation reaction during storage can also be suppressed, and storage stability can also be enhanced. Herein, the "weight average molecular weight" means a value measured by gel permeation chromatography with polystyrene as a standard substance, and can be measured by a method according to JIS-K-7252-1.

The unsaturated group-containing acrylic copolymer is preferably contained in the active light curable resin in a content of 10% by mass or more and 80% by mass or less, more preferably 20% by mass or more and 70% by mass or less, further preferably 20% by mass or more and 50% by mass or less.

Any monomer or oligomer having at least one polymerizable double bond in one molecule can be used as other monomer included in the active light curable resin, without particular limitation. Examples include monofunctional acrylic acid esters such as 2-ethylhexyl acrylate, 2-hydroxypropyl acrylate, glycerol acrylate, tetrahydrofurfuryl acrylate, phenoxyethyl acrylate, nonylphenoxyethyl acrylate, tetrahydrofurfuryloxyethyl acrylate, tetrahydrofurfuryloxyhexanolide acrylate, acrylate of an ε-caprolactone adduct of 1,3-dioxane alcohol, and 1,3-dioxolan acrylate, or methacrylic acid, itaconic acid, crotonic acid, and maleic acid esters obtained by replacing these acrylates with methacrylates, itaconates, crotonates, and maleates; difunctional acrylic acid esters such as ethylene glycoldiacrylate, triethylene glycol diacrylate, pentaerythritol diacrylate, hydroquinone diacrylate, resorcin diacrylate, hexanediol diacrylate, neopentyl glycol diacrylate, tripropylene glycol diacrylate, diacrylate of hydroxypivalic acid neopentyl glycol, diacrylate of neopentyl glycol adipate, diacrylate of an ε-caprolactone adduct of hydroxypivalic acid neopentyl glycol, 2-(2-hydroxy-1,1-dimethylethyl)-5-hydroxymethyl-5-ethyl-1,3-d ioxane diacrylate, tricyclodecanedimethylol acrylate, an ε-caprolactone adduct of tricyclodecanedimethylol acrylate, and diacrylate of diglycidyl ether of 1,6-hexanediol, or methacrylic acid, itaconic acid, crotonic acid, and maleic acid esters obtained by replacing these acrylates with methacrylates, itaconates, crotonates, and maleates; multifunctional acrylic acid esters such as trimethylolpropane triacrylate, ditrimethyloipropane tetraacrylate, trimethylolethane triacrylate, pentaerythritol triacrylate, pentaerythritol tetraacrylate, dipentaerythritol tetraacrylate, dipentaerythritol pentaacrylate, dipentaerythritol hexaacrylate, an ε-caprolactone adduct of dipentaerythritol hexaacrylate, pyrogallol triacrylate, propionic acid/dipentaerythritol triacrylate, propionic acid/dipentaerythritol tetraacrylate, and hydroxypivalaldehyde-modified dimethylolpropane triacrylate, or methacrylic acid, itaconic acid, crotonic acid, and maleic acid esters obtained by replacing these acrylates with methacrylates, itaconates, crotonates, and maleates; a phosphazene monomer, triethylene glycol, isocyanuric acid ethylene oxide-modified diacrylate, isocyanuric acid ethylene oxide-modified triacrylate, dimethylol tricyclodecane diacrylate, trimethylolpropane acrylic acid benzoic acid ester, and alkylene glycol type acrylic acid-modified and urethane-modified acrylates.

Among the above, an acrylic acid ester compound and a methacrylic acid ester compound can be particularly suitably used. Such compounds can be used singly or as a mixture of two or more kinds thereof. A so-called prepolymer obtained by introducing acrylic acid or methacrylic acid into an oligomer having a proper molecular weight can also be suitably used as other addition-polymerizable or crosslinkable compound. Such prepolymers may be used singly, as a mixture of two or more kinds thereof, or as a mixture with any of the above monomers.

Examples of the prepolymer include polyester acrylates formed by introducing (meth)acrylic acid to a polyester obtained by binding of polybasic acid such as adipic acid, trimellitic acid, maleic acid, phthalic acid, terephthalic acid, himic acid, malonic acid, succinic acid, glutaric acid, itaconic acid, pyromellitic acid, fumaric acid, glutaric acid, pimelic acid, sebacic acid, dodecanoic acid, or tetrahydrophthalic acid to a polyhydric alcohol such as ethylene glycol, propylene glycol, diethylene glycol, propylene oxide, 1,4-butanediol, triethylene glycol, tetraethylene glycol, polyethylene glycol, glycerin, trimethylolpropane, pentaerythritol, sorbitol, 1,6-hexanediol or 1,2,6-hexanetriol; epoxy acrylates formed by introducing (meth)acrylic acid to an epoxy resin, such as bisphenol A/epichlorohydrin/(meth) acrylic acid and phenol novolac/epichlorohydrin/(meth) acrylic acid; urethane acrylate formed by introducing (meth) acrylic acid to a urethane resin, such as ethylene glycol/ adipic acid/tolylene diisocyanate/2-hydroxyethyl acrylate, polyethylene glycol/tolylene diisocyanate/2-hydroxyethyl acrylate, hydroxyethylphthalyl methacrylate/xylene diisocyanate, 1,2-polybutadiene glycol/tolylene diisocyanate/2-hydroxyethyl acrylate, and trimethylolpropane/propylene glycol/tolylene diisocyanate/2-hydroxyethyl acrylate; silicone resin acrylates such as polysiloxane acrylate and polysiloxane/diisocyanate/2-hydroxyethyl acrylate; alkyd-modified acrylates formed by introducing a (meth)acryloyl group to an oil-modified alkyd resin; and spiran resin acrylates.

The monomer, oligomer or prepolymer having one or more polymerizable double bonds in the molecule may be contained in the active light curable resin in a proportion of 20% by mass or more and 90% by mass or less.

The protective layer may include a filler other than the resin. In the present invention, while both of peeling stability and durability of the transfer film can be improved by exposure described below, the transfer layer tends to be hardly peeled from the substrate, resulting in deterioration in transfer efficiency of the transfer layer and the occurrence of transfer failures, and also reduction in peeling stability, in the case where breaking strength of the protective layer is enhanced and thus the protective layer has a certain thickness. The protective layer can contain a filler, thereby resulting in an enhancement in rupture resistance and improvements in both of peeling stability and durability of the transfer film, even in the case where the thickness of the protective layer is more than 20 μm.

The volume average particle size of the filler contained in the protective layer is preferably 40 nm or less. The volume average particle size of the filler can be 40 nm or less, thereby allowing transparency of the protective layer to be maintained. The volume average particle size of the filler is preferably 10 nm or more. The volume average particle size of the filler can be 10 nm or more, thereby allowing dispersibility to be maintained and also stability of a protective layer coating liquid to be maintained.

Examples of the filler include an organic filler, an inorganic filler, and an organic-inorganic hybrid type filler. The filler may be a powder or a sol. Among the above fillers, an inorganic particle is preferable in terms of dispersibility.

Examples of the inorganic particle include metal oxide particles such as a silica particle (colloidal silica, fumed silica, precipitated silica, and the like), an alumina particle, a zirconia particle, a titania particle, and a zinc oxide particle, and a silica particle is preferably used from the viewpoint of enhancing wear resistance. Furthermore, the inorganic particle is preferably subjected to a surface treatment with a silane coupling agent such as γ-aminopropyltriethoxysilane or γ-methacryloxypropyltrimethohxysilane.

The filler is preferably contained in a proportion of 5% by mass or more and 60% by mass or less based on the total solid content of the protective layer. The content of the filler can fall within the above numerical value range, thereby enhancing transfer property of the transfer film and wear resistance of a printed product obtained by using the transfer film, and also inhibiting the protective layer from being brittle, to result in the occurrence of defects such as cracking.

The thickness of the protective layer is preferably 5 μm or more and 20 μm or less. The thickness of the protective layer can fall within the above numerical value range, thereby imparting sufficient durability performance and also suppressing transfer failures such as tailing, burr, picking, and lacking.

The protective layer can be formed by coating the intermediate layer with a coating liquid including a composition including the active light curable resin by a known procedure such as roll coating, reverse roll coating, gravure coating, reverse gravure coating, bar coating, or rod coating to form a coating film, and curing the coating film by active light. For example, irradiation with ultraviolet light can be made by using a conventionally known ultraviolet light irradiation apparatus, and any of various apparatuses such as a high-pressure mercury lamp, a low-pressure mercury lamp, a carbon-arc lamp, a xenon arc lamp, a metal halide lamp, an electrodeless ultraviolet light lamp, or LED can be used without limitation. Irradiation with electron beam may be made by using either a high-energy type electron beam irradiation apparatus that radiates electron beam at an energy of 100 keV or more and 300 keV or less or a low-energy type electron beam irradiation apparatus that radiates electron beam at an energy of 100 keV or less, and an irradiation system may be either a scanning irradiation system or a curtain type irradiation system.

<Adhesive Layer>

Next, the adhesive layer, if desired, included in the transfer film according to the present invention is described.

The adhesive layer is provided on the protective layer, and enhances adhesiveness of the transfer layer and the transfer object. The adhesive layer may also serve as a receptive layer on which an image is to be formed by thermal transfer from a thermal transfer sheet having a color material layer according to a thermal transfer method. A transfer portion of the transfer film, on which the image is formed, is transferred to the transfer object, resulting in formation of a printed product.

Examples of the material for forming the adhesive layer include a thermal adhesion-type adhesive agent which is molten or softened by heat and thus bonded, and specific examples include an ionomer-based resin, an acid-modified polyolefin-based resin, an ethylene-(meth)acrylic acid copolymer, an ethylene-(meth)acrylic acid ester copolymer, a polyester-based resin, a polyamide-based resin, a vinyl resin, an acryl/methacryl-based (meth)acrylic resin, an acrylic acid ester-based resin, a maleic acid-based resin, a butyral-based resin, an alkyd-based resin, a polyethylene oxide-based resin, a phenol-based resin, a urea-based resin, a melamine-based resin, a melamine-alkyd-based resin, a cellulose-based resin, a polyurethane-based resin, a polyvinyl ether-based resin, a silicone-based resin, and a rubber-based resin. These resins may be used singly or in combination of a plurality of them. Among them, a vinyl resin, an acrylic resin, a butyral-based resin, and a polyester-based resin are preferable in terms of an adhesion force. A vinyl resin, and a (meth)acrylic resin and an acrylic acid ester-based resin, such as an ethylene-(meth)ethyl acrylate copolymer, are more preferable.

In the case where the adhesive layer serves as a receptive layer, a resin which easily receives a heat-transferable color material such as a sublimation dye or a thermal fusible ink is preferably used. For example, a polyolefin-based resin, a vinyl resin such as polyvinyl chloride, polyvinyl acetate, a vinyl chloride-vinyl acetate-based polymer, an ethylene-vinyl acetate copolymer or a polyacrylic acid ester, a polyester-based resin such as polyethylene terephthalate or polybutylene terephthalate, a polystyrene-based resin, a polyamide-based resin, a copolymer-based resin made of olefin such as ethylene or propylene with other vinyl polymer, an ionomer, a cellulose-based resin such as cellulose diastase, polycarbonate, or the like can be used. Among them, a vinyl chloride-vinyl acetate-based polymer or polyvinyl chloride is preferable, and a vinyl chloride-vinyl acetate-based polymer is particularly preferable.

The thickness of the adhesive layer is usually preferably 0.5 μm or more and 10 μm or less, more preferably 1 μm or more and 3 μm or less.

<Receptive Layer>

The transfer film according to the present invention may, if desired, include a receptive layer. The receptive layer is described below.

While the adhesive layer is adjusted in terms of the configuration thereof to thereby play a role as the receptive layer, as described above, the transfer film may include another receptive layer. In this case, such another receptive layer is provided on the adhesive layer, and an image is formed on the receptive layer, by thermal transfer from a thermal transfer sheet having a color material layer according to a thermal transfer method. A transfer portion of the transfer film, on which the image is formed, is transferred to the transfer object, resulting in formation of a printed product.

Therefore, the material for use in forming the receptive layer can be a material similar to the material for forming the adhesive layer in the case where the adhesive layer serves as a receptive layer.

In the case where the receptive layer is transferred to the transfer object with the adhesive agent or the like, the receptive layer by itself is not necessarily demanded to have adhesiveness. In the case where the receptive layer, however, is transferred to the transfer object without any adhesive agent, a resin material having adhesiveness, such as a vinyl chloride-vinyl acetate copolymer, is preferably used to form the receptive layer.

The thickness of the receptive layer is usually preferably 0.5 μm or more and 10 μm or less, more preferably 1 μm or more and 3 μm or less.

The receptive layer can be formed by adding single or multiple materials selected from the above materials and, if necessary, various additives, dissolving or dispersing them in a proper solvent such as water or an organic solvent to prepare a coating liquid for the receptive layer, applying the coating liquid by a method such as a gravure printing method, a screen printing method, or a reverse coating method using a gravure plate, and drying it.

In the transfer film of the present invention, the adhesive layer not serving as a receptive layer can also be provided on the receptive layer.

<Transfer of Transfer Layer>

The method for transfer the transfer layer on the transfer object by using the transfer film according to the present invention may be a known transfer method, and for example, a known method such as hot stamping (embossing) by heat stamp, whole surface or stripe transfer by a heat roll, or a thermal printer (also referred to as "thermal transfer printer") by a thermal head (heat-sensitive printing head) can be applied. Among them, transfer by a heat roll is preferable.

The transfer object is not particularly limited as long as it is used in any application where durability such as wear resistance or plasticizer resistance is required, and for example, natural fibrous paper, coat paper, tracing paper, a plastic film not decomposed by heat in transfer, glass, a metal, ceramics, wood, a cloth, a medium having dye receptivity, or the like may be used. An IC card and the like are usually needed to have designability and security. In the case where the transfer film according to the present invention includes no receptive layer, a printing layer, a hologram layer or the like is generally provided on a surface of the transfer object, on which the transfer layer is to be transferred.

EXAMPLES

Hereinafter, the present invention is described in more detail with reference to Examples, but the present invention is not intended to be limited to these Examples.

Example 1

A film obtained by coating one surface of a polyethylene terephthalate film having a thickness of 12 μm with a release layer of a melamine-based resin was used as a substrate, and the release layer was coated with an intermediate layer coating liquid having the following composition by gravure coating so that the thickness after drying was 0.5 μm.

<Intermediate Layer Coating Liquid Composition A>

| | |
|---|---|
| Carnauba wax (produced by Konishi Co., Ltd., trade name: WE-95, solid content: 40%) | 2 parts |
| Polyethylene wax (solid content: 40%) | 7 parts |
| Styrene-butadiene rubber (produced by ZEON CORPORATION, trade name: Nipol LX430, volume average particle size: 150 nm, solid content: 49%, Tg: 12° C.) | 1 part |
| Pure water/isopropyl alcohol (1/1) | 100 parts |

Next, the intermediate layer formed was coated with a protective layer coating liquid having the following composition by gravure coating so that the thickness after drying was 6 μm, and the resultant was dried and thereafter irradiated with ultraviolet light by using an UV exposure device (Fusion UV, F600V, LH10 lamp, H valve, reflecting mirror: cold type), thereby forming a protective layer.

<Protective Layer Coating Liquid Composition A>

| | |
|---|---|
| Multifunctional acrylate (produced by Shin-Nakamura Chemical Co., Ltd., trade name: NK ester A-9300, trifunctional) | 20 parts |
| Urethane acrylate (produced by Shin-Nakamura Chemical Co., Ltd., trade name: NK oligomer UA122-P, difunctional) | 20 parts |
| Urethane acrylate (produced by Shin-Nakamura Chemical Co., Ltd., trade name: NK ester U-15HA, pentadecafunctional) | 10 parts |
| Acrylic copolymer (produced by Shin-Nakamura Chemical Co., Ltd., trade name: NK ester C24T) | 5 parts |
| Photopolymerization initiator (produced by Ciba Specialty Chemicals Co., Ltd., trade name: Irgacure 184) | 5 parts |
| Filler (silica) (produced by NISSAN CHEMICAL INDUSTRIES LTD., trade name: MEK-AC2140Z, volume average particle size: 12 nm) | 40 parts |
| Toluene | 200 parts |
| Methyl ethyl ketone | 200 parts |

Next, the protective layer formed as described above was coated with an adhesive layer coating liquid by gravure coating so that the thickness after drying was 2 μm, and the resultant was dried, thereby forming an adhesive layer. Herein, the adhesive layer having the following composition in the present Example also served as a receptive layer.

<Adhesive Layer Coating Liquid Composition>

| | |
|---|---|
| Vinyl chloride-vinyl acetate copolymer (produced by Nissin Chemical Co., Ltd., trade name: CNL) | 95 parts |
| Epoxy-modified silicone oil (produced by Shin-Etsu Chemical Co., Ltd., trade name: KP-1800U) | 5 parts |
| Toluene | 200 parts |
| MEK | 200 parts |

Example 2

A transfer film was produced in the same manner as in Example 1 except that a protective layer was formed by coating and drying so that the thickness after drying was 0.2 μm in Example 1.

Example 3

A transfer film was produced in the same manner as in Example 1 except that the composition of the intermediate layer coating liquid was changed as shown below in Example 1.

<Intermediate Layer Coating Liquid Composition B>

| | |
|---|---|
| Carnauba wax (produced by Konishi Co., Ltd., trade name: WE-95, solid content: 40%) | 4.5 parts |
| Polyethylene wax (solid content: 40%) | 4.5 parts |
| Styrene-butadiene rubber (produced by ZEON CORPORATION, trade name: Nipol LX430, volume average particle size: 150 nm, solid content: 49%) | 1 part |
| Pure water/isopropyl alcohol (1/1) | 100 parts |

Example 4

A transfer film was produced in the same manner as in Example 1 except that the composition of the intermediate layer coating liquid was changed as shown below in Example 1.

<Intermediate Layer Coating Liquid Composition C>

| | |
|---|---|
| Carnauba wax (produced by Konishi Co., Ltd., trade name: WE-95, solid content: 40%) | 7 parts |
| Polyethylene wax (solid content: 40%) | 2 parts |
| Styrene-butadiene rubber (produced by ZEON CORPORATION, trade name: Nipol LX430, volume average particle size: 150 nm, solid content: 49%) | 1 part |
| Pure water/isopropyl alcohol (1/1) | 100 parts |

Example 5

A transfer film was produced in the same manner as in Example 1 except that the composition of the intermediate layer coating liquid was changed as shown below in Example 1.

<Intermediate Layer Coating Liquid Composition D>

| | |
|---|---|
| Carnauba wax (produced by Konishi Co., Ltd., trade name: WE-95, solid content: 40%) | 9.85 parts |
| Styrene-butadiene rubber (produced by ZEON CORPORATION, trade name: Nipol LX430, volume average particle size: 150 nm, solid content: 49%) | 0.25 parts |
| Pure water/isopropyl alcohol (1/1) | 100 parts |

Example 6

A transfer film was produced in the same manner as in Example 1 except that the composition of the intermediate layer coating liquid was changed as shown below in Example 1.

Intermediate Layer Coating Liquid Composition E

| | |
|---|---|
| Carnauba wax (produced by Konishi Co., Ltd., trade name: WE-95, solid content: 40%) | 9.15 parts |
| Styrene-butadiene rubber (produced by ZEON CORPORATION, trade name: Nipol LX430, volume average particle size: 150 nm, solid content: 49%) | 0.85 parts |
| Pure water/isopropyl alcohol (1/1) | 100 parts |

Example 7

A transfer film was produced in the same manner as in Example 1 except that the composition of the intermediate layer coating liquid was changed as shown below in Example 1.

<Intermediate Layer Coating Liquid Composition F>

| | |
|---|---|
| Carnauba wax (produced by Konishi Co., Ltd., trade name: WE-95, solid content: 40%) | 2 parts |
| Polyethylene wax (solid content: 40%) | 7 parts |
| Styrene-butadiene rubber (produced by ZEON CORPORATION, trade name: Nipol LX433C, volume average particle size: 100 nm, solid content: 50%, Tg: 50° C.) | 1 part |
| Pure water/isopropyl alcohol (1/1) | 100 parts |

Example 8

A transfer film was produced in the same manner as in Example 1 except that the composition of the intermediate layer coating liquid was changed as shown below in Example 1.

<Intermediate Layer Coating Liquid Composition F>

| | |
|---|---|
| Carnauba wax (produced by Konishi Co., Ltd., trade name: WE-95, solid content: 40%) | 2 parts |
| Polyethylene wax (solid content: 40%) | 7 parts |
| Styrene-butadiene rubber (produced by ZEON CORPORATION, trade name: Nipol LX435, volume average particle size: 120 nm, solid content: 50%, Tg: −14° C.) | 1 part |
| Pure water/isopropyl alcohol (1/1) | 100 parts |

Example 9

A transfer film was produced in the same manner as in Example 1 except that the composition of the intermediate layer coating liquid was changed as shown below in Example 1.

<Intermediate Layer Coating Liquid Composition F>

| | |
|---|---|
| Carnauba wax (produced by Konishi Co., Ltd., trade name: WE-95, solid content: 40%) | 2 parts |
| Polyethylene wax (solid content: 40%) | 7 parts |
| Styrene-butadiene rubber (produced by ZEON CORPORATION, trade name: Nipol2507H, volume average particle size: 250 nm, solid content: 52%, Tg: 58° C.) | 1 part |
| Pure water/isopropyl alcohol (1/1) | 100 parts |

Comparative Example 1

A transfer film was produced in the same manner as in Example 1 except that no release layer and no intermediate layer were formed in Example 1.

Comparative Example 2

A transfer film was produced in the same manner as in Example 1 except that no intermediate layer was formed and the protective layer was changed to a layer formed using a coating liquid having the following composition in Example 1.

<Protective Layer Coating Liquid Composition B>

| | |
|---|---|
| Active light curable resin composition b | 30 parts |
| Polyethylene wax | 0.6 parts |
| Photopolymerization initiator (produced by Ciba Specialty Chemicals Co., Ltd., trade name: Irgacure 907) | 0.9 parts |
| Ethyl acetate/methyl isobutyl ketone (1/1) | 70 parts |

<Production Procedure of Active Light Curable Resin Composition b>

Active light curable resin composition b was produced by the following procedure. A reactor equipped with a stirrer, a reflux condenser, a dropping funnel and a thermometer was charged with 61 parts (206.1 g) of ethyl acetate and 39 parts (133.5 g) of a trimer of isophorone diisocyanate (produced by HULS, trade name: VESTANAT T1890, melting point: 110° C.), heated to 80° C. and molten. After air was blown into the resulting solution, 0.11 parts (0.38 g) of hydroquinone monomethyl ether, 73.4 parts (249.3 g) of pentaerythritol triacrylate (produced by OSAKA ORGANIC CHEMICAL INDUSTRY LTD., trade name: Biscoat 300) and 0.11 parts (0.38 g) of dibutyl tin dilaurate were loaded. Next, a reaction was performed at 80° C. for 5 hours, and thereafter 203 parts (688.9 g) of ethyl acetate was added and cooled, thereby providing active light curable resin composition b.

Comparative Example 3

A transfer film was produced in the same manner as in Example 1 except that no intermediate layer was formed in Example 1.

Comparative Example 4

A transfer film was produced in the same manner as in Example 1 except that the protective layer in Example 1 was changed to a protective layer formed by coating with a protective layer coating liquid having the following composition by gravure coating so that the thickness after drying was 6 μm.

<Protective Layer Coating Liquid Composition C>

| | |
|---|---|
| Styrene-acrylic resin (produced by Mitsui Chemicals, Inc., | 15 parts |

-continued

| | |
|---|---|
| trade name: MUTICLE PP320P) | |
| Polyvinyl alcohol | 10 parts |
| (produced by The InkTec, | |
| trade name: C-318) | |
| Water/ethanol (1/1) | 7 parts |

Comparative Example 5

A transfer film was produced in the same manner as in Example 1 except that the composition of the intermediate layer coating liquid was changed as shown below in Example 1.
<Intermediate Layer Coating Liquid Composition F>

| | |
|---|---|
| Carnauba wax | 10 parts |
| (produced by Konishi Co., Ltd., | |
| trade name: WE-95) | |
| Pure water/isopropyl alcohol (1/1) | 100 parts |

Comparative Example 6

A transfer film was produced in the same manner as in Example 1 except that the composition of the intermediate layer coating liquid was changed as shown below in Example 1.
<Intermediate Layer Coating Liquid Composition G>

| | |
|---|---|
| Carnauba wax | 8 parts |
| (produced by Konishi Co., Ltd., | |
| trade name: WE-95, solid content: 40%) | |
| Paraffin wax | 2 parts |
| (produced by Konishi Co., Ltd., | |
| trade name: WE-65) | |
| Pure water/isopropyl alcohol (1/1) | 100 parts |

<Evaluation of Transfer Film>

A card substrate having the following material composition was used as a transfer object.
<Composition of Card Substrate>

| | |
|---|---|
| Polyvinyl chloride compound | 100 parts |
| (degree of polymerization: 800) | (containing 10% of additive such as stabilizer) |
| White pigment (titanium oxide) | 10 parts |
| Plasticizer (dioctyl phthalate) | 0.5 parts |

The transfer sheet in each of Examples 1 to 9 and Comparative Examples 1 to 6 described above was used and the transfer layer (serving as protective layer, adhesive layer and receptive layer) was transferred by using an HDP-5000 printer (manufactured by HID Global Corporation) onto the card, thereby forming a printed product.

<<Peeling Stability Test>>

A double-faced tape was pasted on a table warmed at 70° C., and a transfer film sample having a width size of 65 mm was placed thereon and allowed to adhere to the double-faced tape. The sample was peeled with a round spring type tension gauge by 90 degrees, performing peeling force measurement three times, to measure the maximum value and the minimum value, and the variation in maximum/minimum peeling force (peeling stability) was calculated based on the following expression. In addition, the evaluation test was performed according to the following criteria. The evaluation results were as shown in Table 1 below.

Peeling stability=Maximum peeling force/Minimum peeling force    [Expression 1]

○: the value of peeling stability was 1.00 or more and less than 1.35
Δ: the value of peeling stability was 1.35 or more and less than 1.75
x: the value of peeling stability was 1.75 or more <<Foil Tearing Test>>

Foil cutting (tailing) of the transfer layer onto the card substrate was visually confirmed under the above transfer conditions, and the evaluation test was performed according to the following criteria. The evaluation results were as shown in Table 1 below.

○: almost no tailing occurred (less than 1 mm)
Δ: tailing occurred (1 mm or more and less than 2 mm)
x: much tailing occurred (2 mm or more)

TABLE 1

| | Evaluation Items | |
|---|---|---|
| | Peeling Peeling Stability | Evaluation of Printed Product Tailing |
| Example 1 | ○ | ○ |
| Example 2 | ○ | ○ |
| Example 3 | Δ | Δ |
| Example 4 | Δ | ○ |
| Example 5 | ○ | Δ |
| Example 6 | ○ | Δ |
| Example 7 | ○ | ○ |
| Example 8 | ○ | ○ |
| Example 9 | ○ | ○ |
| Comparative Example 1 | x | Not transferred, and thus not evaluated |
| Comparative Example 2 | Δ | x |
| Comparative Example 3 | x | x |
| Comparative Example 4 | x | x |
| Comparative Example 5 | ○ | x |
| Comparative Example 6 | x | x |

REFERENCE SIGNS LIST 1 transfer film
10 substrate
20 release layer
30 intermediate layer
40 protective layer
50 adhesive layer
60 receptive layer
70 transfer layer

The invention claimed is:
1. A transfer film comprising at least:
a substrate;
a release layer provided on the substrate;
an intermediate layer provided on the release layer; and
a protective layer provided on the intermediate layer;
wherein the intermediate layer comprises a wax component, comprising polyethylene wax and carnauba wax, and a rubber component, wherein a compounding mass ratio of the polyethylene wax to the carnauba wax is in a range of 7/2 to 8/1; and wherein the protective layer comprises an active light curing resin.

2. The transfer film according to claim 1, wherein the rubber component of the intermediate layer comprises styrene-butadiene rubber.

3. The transfer film according to claim 1, wherein the rubber component comprises a rubber particle having a volume average particle size in a range of 80 nm to 250 nm.

4. The transfer film according to claim 1, wherein the intermediate layer comprises 0.01% by mass to 35% by mass of the rubber component.

5. The transfer film according to claim 1, wherein a thickness of the intermediate layer is in a range of 0.05 μm to 1 μm.

6. The transfer film according to claim 1, wherein the active light curing resin comprises an unsaturated group-containing acrylic copolymer comprising a monomer unit represented by the following general formula (1):

(1)

wherein $R_1$ and $R_2$ each independently represent a hydrogen atom or a methyl group;

wherein $R_3$ represents a hydrogen atom, an alkyl group or an aryl group, provided that when $R_2$ represents a methyl group, $R_3$ represents a hydrogen atom; and wherein L represents a divalent linking group.

7. The transfer film according to claim 1, further comprising a receptive layer on the protective layer.

8. The transfer film according to claim 1, wherein the release layer comprises a melamine-based resin.

* * * * *